R. N. SIKES.
STALK CUTTER.
APPLICATION FILED APR. 4, 1911.
1,014,337.
Patented Jan. 9, 1912.
2 SHEETS—SHEET 1.
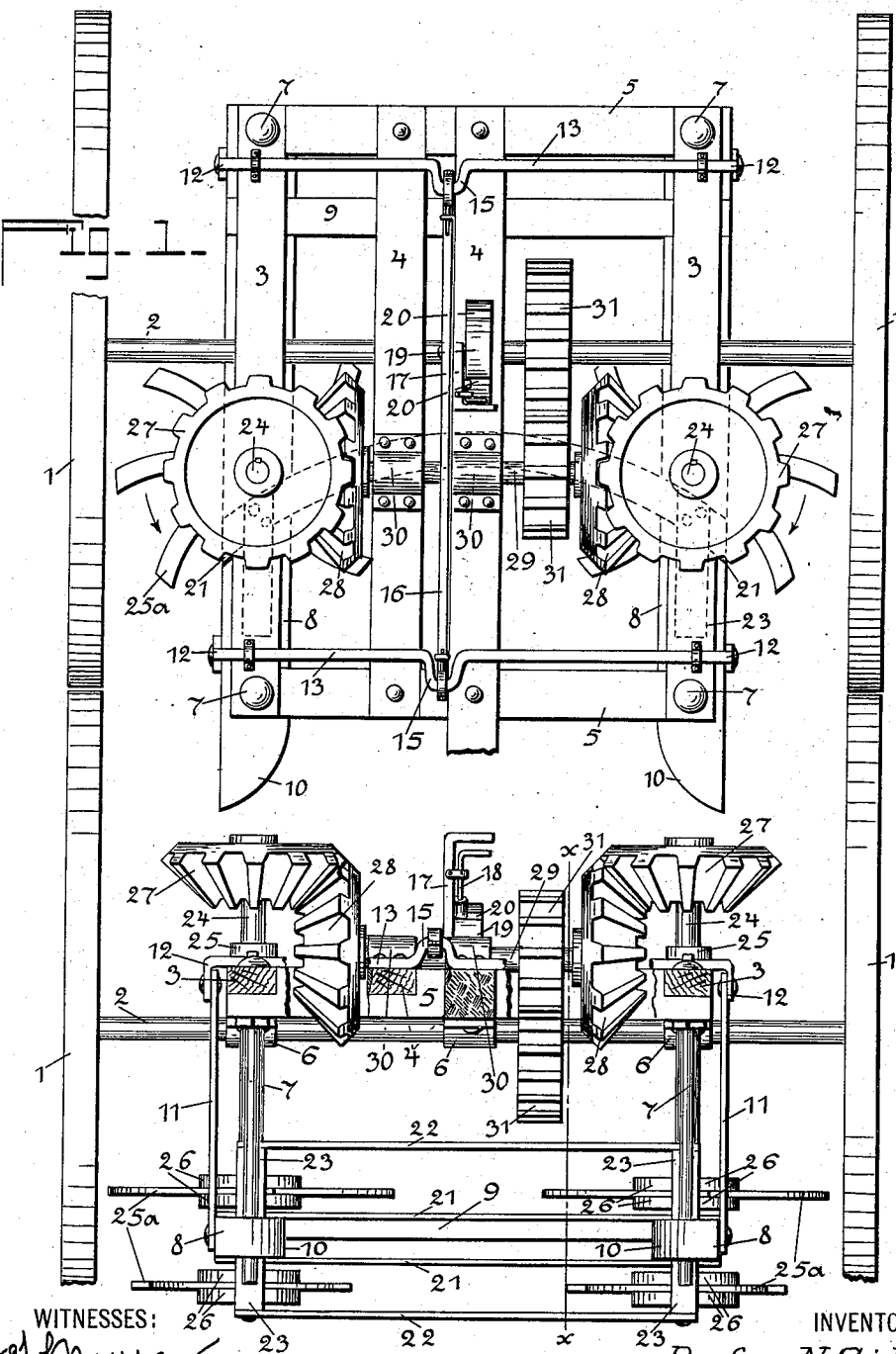
WITNESSES:
INVENTOR
Rufus N. Sikes.
ATTORNEY R. N. SIKES.
STALK CUTTER.
APPLICATION FILED APR. 4, 1911.
1,014,337.
Patented Jan. 9, 1912.
2 SHEETS—SHEET 2.
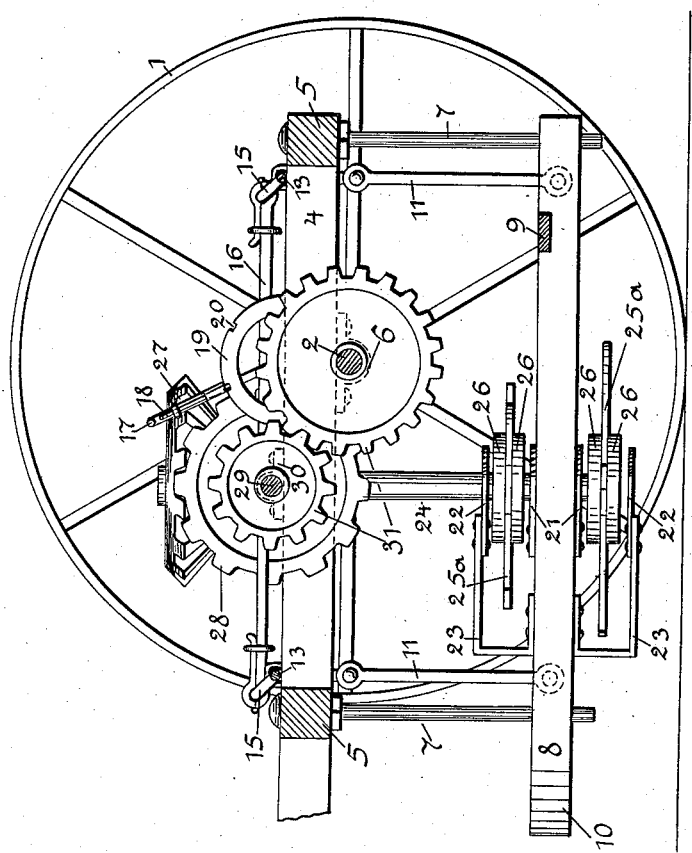
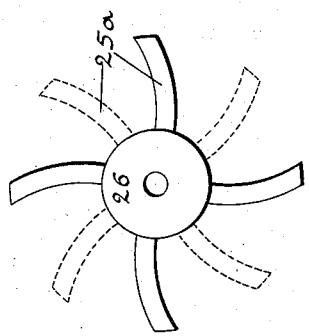
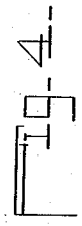
WITNESSES:
INVENTOR
Rufus N. Sikes.
BY
ATTORNEY

UNITED STATES PATENT OFFICE.

RUFUS N. SIKES, OF BURLESON, TEXAS.

STALK-CUTTER.

1,014,337. Specification of Letters Patent. Patented Jan. 9, 1912.

Application filed April 4, 1911. Serial No. 618,827.

*To all whom it may concern:*

Be it known that I, RUFUS N. SIKES, a citizen of the United States, residing at Burleson, in the county of Johnson and State of Texas, have invented certain new and useful Improvements in Stalk-Cutters, of which the following is a specification.

My invention relates to new and useful improvements in stalk cutters, and relates more particularly to cotton stalk cutters. Its object is to provide a stalk cutter that will travel through a field, and which will carry a mechanism operated by the transporting wheels, adapted to cut the stalks into small fragments that will readily decompose when plowed under, acting as a fertilizer.

The object is more specifically to provide a stalk cutter adapted to act simultaneously upon two rows of stalks, having a vertical shaft mounted at each side, adapted to rotate rapidly during the travel of the machine, throwing the stalks against transverse bars mounted upon a suitable frame, which bars prevent the stalks bending under the impact of the blades.

The object of my invention is finally to provide a device of the character described that will be strong, durable, simple and efficient, and comparatively easy to construct, and also one, the various parts of which will not be likely to get out of working order.

With these and various other objects in view, my invention has relation to certain novel features of the construction and operation, an example of which is described in the following specification and illustrated in the accompanying drawing, wherein:

Figure 1 is a top view of the herein described stalk cutter, the tongue thereof and one of the transporting wheels being partially broken away. Fig. 2 is a front view of the machine with the lower portions of the wheels and a portion of the frame again broken away. Fig. 3 is a vertical sectional view of the stalk cutter, the section being taken upon the line *x—x* of Fig. 2. Fig. 4 is a detail view of one of the rotatable blade holders, two of which are mounted upon a vertical rod at each side of the machine, the lower blades being shown in dotted lines.

Referring now more particularly to the drawings wherein like numerals of reference designate similar parts in all the figures, the numeral 1 denotes the transporting wheels of the machine, and 2 the axle upon which said wheels are rigidly mounted. The axle 2 furnishes a pivotal support for a frame-work, consisting of longitudinal beams 3 and 4 connected by cross pieces 5 at their extremities. The axle is journaled in bearings 6, one of which is provided on the under surface of each beam 3, and one also upon one of the beams 4, the latter being extended to form the tongue of the vehicle. The frame formed by the members 3, 4 and 5 carries four vertical rods 7, one of which projects rigidly downward from each corner of said frame. The lower extremities of the rods 7 serve as guides for a vertically adjustable frame, formed by a pair of longitudinal members 8, rigidly connected by a cross-bar 9 near their rear extremities. The inner face of each bar 8 is intended to contact with a row of stalks during the travel of the machine, and the forward extremities of said bars are rounded off as indicated at 10 in order to deflect any stalks inward, which contact with said extremities. The frames formed by the members 8 and 9 are supported by four rods 11. Two of these rods are attached to each beam 8, having pivotal connection therewith, and the upper extremities of said rods are pivotally secured to crank arms 12, provided upon the extremity of rocker shafts 13, one of which is transversely mounted upon the beams 3 at each end thereof. When the shafts 13 are rocked, a partial rotation of the arms 12 results, causing the beams 8 to be vertically adjusted upon their guiding rods 7. Each of the rocker shafts 13 is provided with U shaped cranks 15 near its middle, and said cranks are joined by a connecting rod 16, by which they may be caused to rock simultaneously. Any suitable means may be employed to establish pivotal connection between the extremities of the rod 16 and the cranks 15. A lever 17 is pivotally mounted upon one of the beams 4 near the middle of said beam, and has pivotal connection with the rod 16, adjacent to its lower extremity. By swinging the lever 17 forward or back a simultaneous rocking motion may be applied to the two shafts 13, producing vertical adjustment of the frames formed by the parts 8 and 9 in the manner above described. In order to hold the lever 17 in its two positions of adjustment, there is the usual provision made of a spring pressed toothed rod 18, and a circular segment 19, provided with two grooves 20 adapted to receive the rod 18 in either position of adjustment.

A pair of thin parallel bars 21 are extended between the beams 8 near their middle, said bars having the form of a circular arc, curving toward the rear of the vehicle. The extremities of the bars rest upon the upper and lower sides of the beams 8. A pair of similar bars 22 are supported at a short distance above and below the bars 21, brackets 23 being extended from the top and bottom surfaces of the beams 8 to receive the extremities of the bars 22. At opposite sides of the machine, a pair of vertical shafts 24 are mounted, their upper extremities being journaled in the beams 3, and their lower extremities in the beams 8, just at the rear of the bars 22. A set-collar 25 is fast upon each shaft, and rests upon one of the beams 3 when the shafts are in their working position. Each shaft carries two sets of knife blades 25$^a$, each set being held in place by a pair of suitable clamps 26. One set of the blades is mounted above the beam 8 upon each shaft, and one below said beam, so that the blades of each set rotate between one of the bars 21 and one of the bars 22. Each set consists of four blades, which project in a radial direction, and are slightly curved, the cutting edge being upon the concave side of the blade.

Each of the shafts 24 carries a bevel gear 27 fast upon its upper extremity, and each of the gears 27 engages a similar gear 28, during the operation of the machine. The gears 28 are mounted upon the respective extremities of a shaft 29, mounted transversely of the machine in bearings 30 carried by the beams 4. Rotation may be communicated to the shaft 29 from the axle of the machine by a pair of intermeshed spur gears 31.

The machine is shown in the drawing with the lever 17 in its forward position, thus causing the crank 15 of the rocker shafts 13 to project forwardly, and causing the arms 12 of said shafts to project down. When the lever is in this position the adjustable frames, formed by the parts 8 and 9 with the shafts 24, will be in their lowest positions of adjustment, and the cutter mechanism will be operative during the travel of the machine. When it is desired to make this mechanism inoperative, as for example in traveling to or from a field, the lever 17 will be swung to its other position of adjustment, causing it to project rearwardly. This will cause the rocker shafts 13 to lie with the cranks 15 projecting rearwardly, and with the arms 12 projecting forwardly, causing the adjustable frame to be raised. The raising of this frame produces also an elevation of the two shafts 24, since the beams 8 will exert an upward pressure upon the upper set of clamps 26.

When the shafts 24 are thus raised, the bevel gears 27 will be thrown out of mesh with the gears 28, so that there can be no communication of rotation from the latter to the former. The direction of rotation of the blades 25$^a$ is indicated in Fig. 1 by arrows. In traversing a field, the machine travels over two rows of stalks, and the relative position of the beams 8 is such that they will just clear the outside of each row. As each stalk comes into the path of the rapidly rotating knives 25$^a$, it will be thrown against the bars 21 and 22 and be cut into two pieces. As these pieces fall to the ground they will again enter the path of the knives and be further reduced in length. When the cutting mechanism is in its lowest position, the two lower sets of knives will be acting only a few inches from the ground, so that there will be only a very small portion of each stalk left standing. By reducing the stalks to small pieces in the manner above described, they may be more readily plowed under, and will more quickly decompose in the ground to form fertilizer.

It is apparent that various changes might be made in the proportions and mechanical details of this invention without departing from the spirit thereof, and the invention is, therefore, presented as covering all such changes and modifications as may be included within the scope of the following claims.

What I claim is:

1. In a stalk cutter, the combination with a pair of transporting wheels, and an axle rigid with said wheels, of a frame pivotally mounted upon said axle, parallel guide rods projecting rigidly downward from said frame, an adjustable frame mounted on said guide rods, a vertical shaft, having its extremities journaled in the two frames, a set of blades rigidly mounted on the lower extremity of the shaft, and projecting in a radial direction therefrom, a pair of bars transversely mounted upon the adjustable frame, between which said blades are adapted to rotate, means for raising or lowering the adjustable frame upon the guide rods, and a mechanism adapted to communicate rotation to said shaft when the adjustable frame is in its lowered position.

2. In a stalk cutter, the combination with a pair of transporting wheels, of an axle rigid on said wheels, a frame pivotally mounted upon the axle, a plurality of guide rods projecting rigidly downward from said frame, an adjustable frame mounted upon the lower extremities of the guide rods, rocker shafts mounted transversely upon the front and rear portions of the upper frame, the extremities of said shafts forming cranks, means supporting the adjustable frame from the extremities of the rocker shaft, means by which the rocker shafts may be simultaneously operated, a vertical shaft rotatably mounted at each side of the machine between the upper and lower frames, a plurality of knives rigidly mounted upon the lower extremity of each shaft, and projecting radially therefrom, a plurality of bars transversely mounted upon the lower frame, between which said blades are adapted to rotate, and a mechanism communicating rotation to the vertical shafts from the axle when the adjustable frame is lowered.

In testimony whereof I have signed my name to this specification in the presence of two subscribing witnesses.

RUFUS N. SIKES.

Witnesses:
J. L. MALLETT,
I. A. GILKERSON.

Copies of this patent may be obtained for five cents each, by addressing the "Commissioner of Patents, Washington, D. C."